(12) United States Patent
Pakki et al.

(10) Patent No.: US 6,402,948 B1
(45) Date of Patent: *Jun. 11, 2002

(54) FILTER-SEPARATOR FOR PURIFYING LIQUID HYDROCARBONS

(75) Inventors: Victor Pakki; Irina Arnoldi; Greg Pakki, all of Unit BZ (UA); Arcady Beleske, Marblemead, MA (US); Michael Pakki, Unit BZ (UA)

(73) Assignee: Phoenix Environmental Assets Corp., N. Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/553,353

(22) Filed: Apr. 21, 2000

(51) Int. Cl.[7] .......................... B01D 35/06; B01D 33/27; B03C 1/30
(52) U.S. Cl. ........................................ 210/223; 210/222
(58) Field of Search ................................ 210/222, 223, 210/512.1, 415; 184/6.24, 625; 96/1

(56) References Cited

U.S. PATENT DOCUMENTS 2,838,179 A * 6/1958 Thomas ...................... 210/223
5,401,396 A * 3/1995 Lescovich et al. .......... 210/415
5,814,211 A * 9/1998 Leo ............................. 210/223
6,162,357 A * 12/2000 Pakki et al. ................. 210/223

OTHER PUBLICATIONS

Derwent Abstract 85300E (SU 886940) Self–cleaning cansister filter, Dec. 1981.*

Derwent Abstract 90062E (SU 891120) Magnetic filter for cleaning of liquid coolants for electrical machines, Dec. 1981.*

Derwent Abstract 034758 (SU 1318258) Filter for cleaning liquids, Jun. 1987.*

* cited by examiner

Primary Examiner—David A. Reifsnyder
(74) Attorney, Agent, or Firm—I. Zborovsky

(57) ABSTRACT

A filter separator for purification of liquid hydrocarbons has a housing provided with an inlet pipe and an outlet pipe, a filtering element located in the housing, a magnetic screening including a plurality of rods, a drive provided for the magnetic screen, the drive being formed by a plurality of cup-shaped blades connected with the rods.

5 Claims, 2 Drawing Sheets

FILTER-SEPARATOR FOR PURIFYING LIQUID HYDROCARBONS

BACKGROUND OF THE INVENTION

The present invention relates to devices and method of purifying of liquid hydrocarbons (oil, hydrocarbon gas condensate, gasoline, kerosene, diesel fuel, liquid propane-butane fractions) from low-fraction emulsified water and mechanical admixtures, and can be used in oil and gas excavation industry on the wells, in oil excavation, petrochemical, and gas processing industries.

A cartridge filter which is self purifying is disclosed for example in an Inventor's Certificate of the USSR No. 886,940. It is used for purifying of natural and recirculating waters. The filter includes a housing with pipes for introducing and withdrawing of liquids, filtering cartridges, brushes, a drive for brush rotation and a pipe for withdrawable impurities. This filter has disadvantage that it does not provide purification of liquid simultaneously by all filtering cartridges, since periodically one of the filtering cartridges is turned off for cleaning.

Another filter for liquid cleaning is disclosed in the Inventor's Certificate of the USSR 1,318,528. This filter includes a housing, a cover with inlet and outlet openings, a filtering element mounted in a central part of the cover and a magnetic trap. In order to increase efficiency of purification and increase service life, the magnetic trap is formed as a permanent ring-shaped magnet, which is installed on ends of pole elements in form of disks from magneto-soft material. The disadvantage of the construction of this filter is that the cleaning of the magnetic trap is not provided. Also, the construction of the filter is very metal consuming.

Another magnetic filtering for purifying of liquids is disclosed in the Inventor's Certificate of the USSR 891,120. This filter is designed for liquid cooling of large electrical machines and includes a housing, a pipe for introducing and withdrawal of liquid, a magnetic guide with openings and a magnetizing coil. The main disadvantage of the construction of this filter is that, a constant purification of the liquid is not provided, since for its cleaning from impurities by a reverse washing, it is necessary to stop the filtration. Moreover, on the surface of the magnet "brushes" for mechanical admixtures are formed, which are partially washed by a liquid flow and are caught in the system with a clean liquid.

Another filter-separator which is the closes to the solution disclosed in the present application is the one which is disclosed in "purification of working liquid in hydraulic drives of power tools", M. Machine Building 1976, page 247, FIG. 140. This filter separator has a housing with pipes for introduction and withdrawal of oil, a filtering element, and immovable magnetic screen which is formed by magnetic rods. The dirty working liquid is introduced through the inlet pipe into the housing of the filter-separator, where it is obtained by a magnetic screen and then by a filtering element. The ferromagnetic particles are attracted by the screen and deposited on it, while non magnetic particles are caught by the filtering element. However, since the magnetic screen is immovable, the magnetic rods are covered with ferromagnetic particles, and the surface of the filtering element is clogged by non magnetic particles. It considerably reduces an intra-regenerating period of the filter-separator.

SUMMARY OF THE INVENTION

Accordingly, it is an object of the present invention to provide a filter separator which avoids the disadvantages of the prior art.

More particularly it is an object of the present invention to provide a filter separator in which a quality of purification of liquid hydrocarbons in increased, growing of ferromagnetic particles on the magnetic rods and clogging of the filtering element are reduced.

In keeping with these objects and with others which will become apparent hereinafter, a filter-separator is proposed which has a housing with inlet and outlet pipes and a filtering element located in it and provided with a magnetic stream, wherein the magnetic stream is formed so that it can rotate around a filtering element and is schematically connected with a rotary drive arranged in an upper part of the housing, while the magnetic screen is formed from screw-shaped rods which have different angle of inclination to an axis of the filter pack, on which magnetic elements are fixedly arranged. Various attachments such as brushes, scrappers, etc. are arranged at the side of the filtering element on the screw-shaped rods.

The screw-shaped rods can have different cross-sections such as for example circular, square linear, semi-circular, etc.

A second filter pack is arranged coaxially inside the first filter pack, and an annular cavity between the filter packs is separated by a cylinder. In the upper part the cylinder has a whirling element and separates the cavity within the filter packs, while the lower part of the cylinder is open.

In order to prevent entrainment of water into liquid hydrocarbons with 100% guarantee, an inter-phase float with conical valves is arranged inside the inner filter pack on plungers in upper and lower portions.

The novel features which are considered as characteristic for the present invention are set forth in particular in the appended claims. The invention itself, however, both as to its construction and its method of operation, together with additional objects and advantages thereof, will be best understood from the following description of specific embodiments with read in connection with the accompanying drawings.

DESCRIPTION OF PREFERRED EMBODIMENTS

Figure 1:
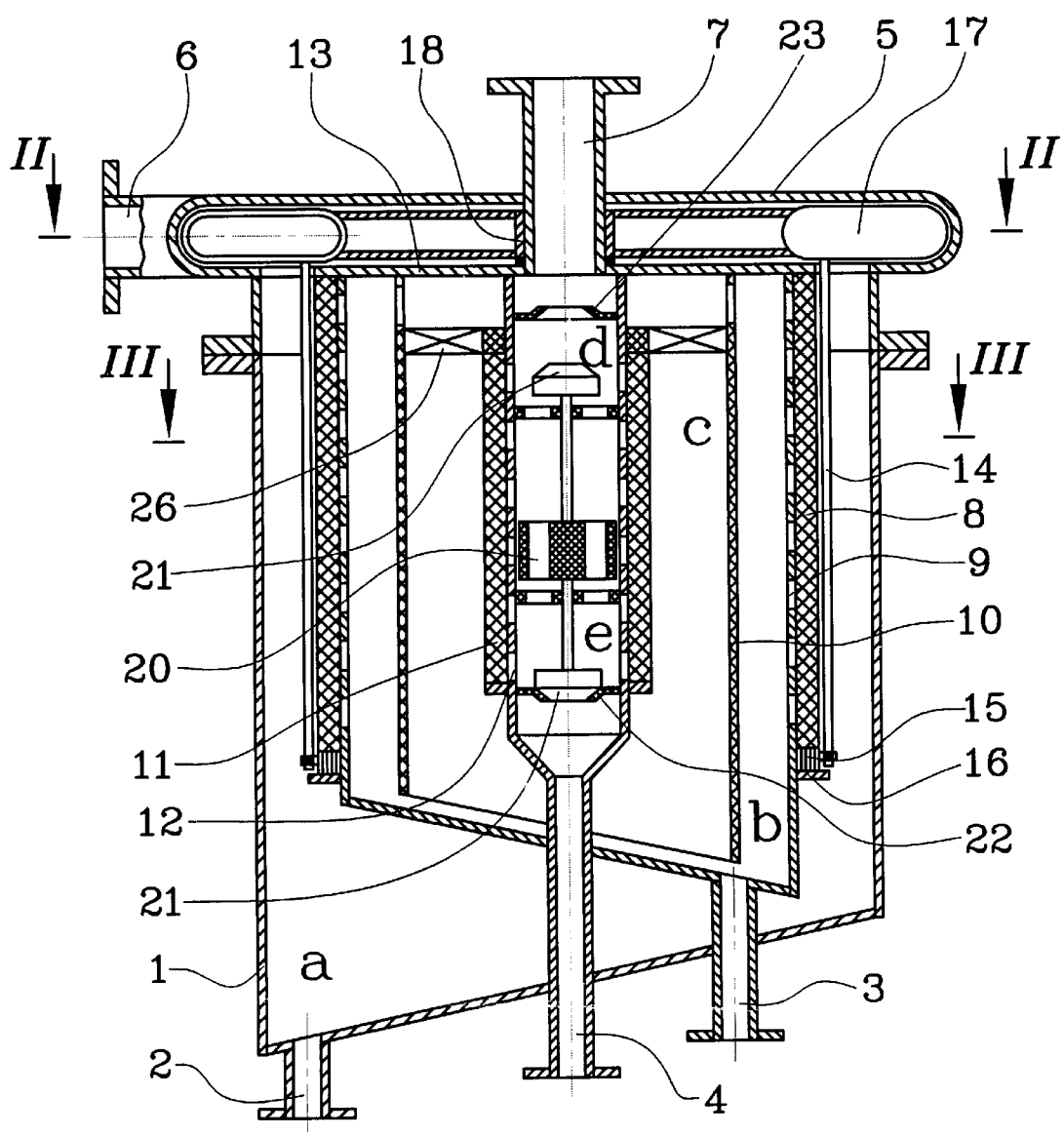
FIG. 1 is a view schematically showing a vertical cross-section of a filter separator in accordance with the present invention.
Figure 2:
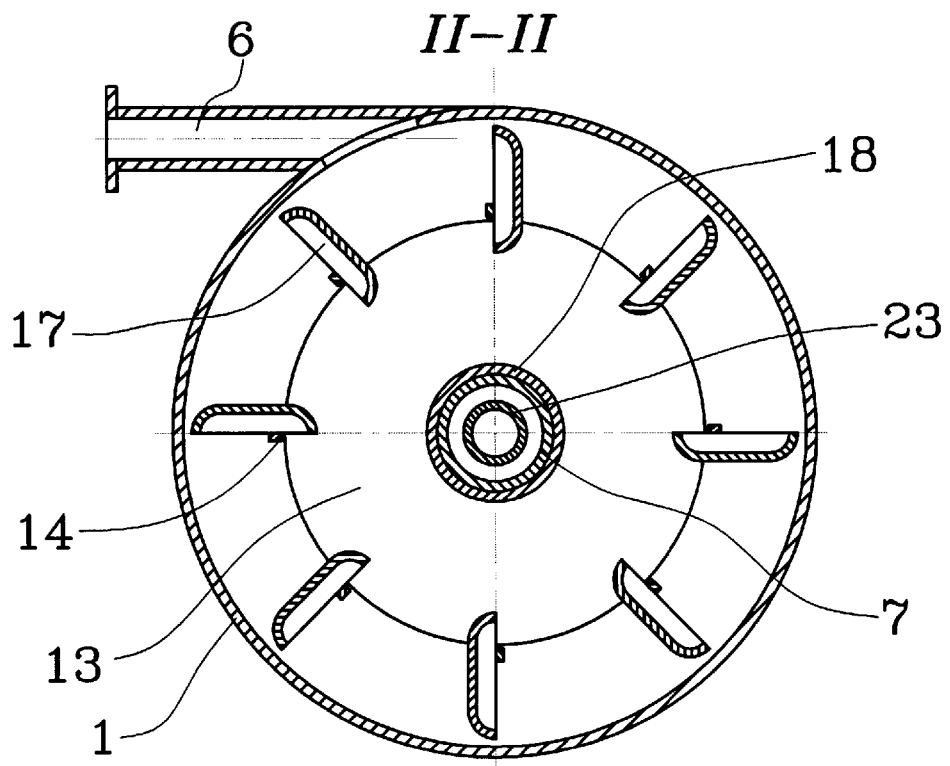
FIG. 2 is a view showing a cross-section of the filter separator of FIG. 1 taken along the line II—II in FIG. 1.
Figure 3:
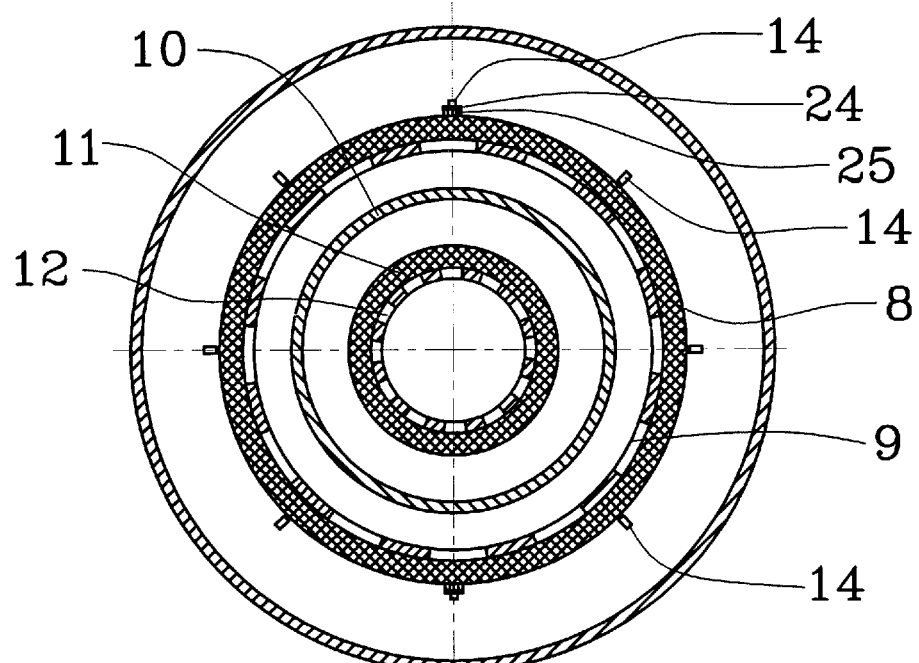
FIG. 3 is a view showing a cross-section of the filter separation of FIG. 1, taken along the line III—III in FIG. 1.

A filter separator in accordance with the present invention is used for purifying of liquid hydrocarbons from water and mechanical admixtures. It has a housing with a separable flanges 1 and pipes for training of liquids from cavities 2, 3 and 4. The upper part of the housing 1 is connected with a cover 6 which has a tangential inlet pipe for a liquid 6 and an outlet pipe for a liquid 7. The filtering elements 8 are assembled on a perforated casing 9 and form a filtering set of a first stage of purification. Filtering elements 11 are assembled on a perforated casing 12 and form a filtering set of a second stage of purification.

A filter 10 which is coaxial with the filtering sets of the first and second stage are arranged between them and coaxially with them. It is fixed in the upper part and has an in the upper part windows for passage of fuel and is open at the bottom. Filter 10, the perforating casings 9 and 10 are connected with the upper part by a horizontal plate 13 which is located in the upper part of the filter separator. Rods 14 are located at the outer surface of the filtering elements 8. In the lower part they are fixedly connected with a bearing 15 which is supported on a ring 16 fixedly connected with the casing 9. The upper part of the rods is fixedly connected to a blade apparatus 17 which is formed as a set of cup-shaped blades.

The blades are formed as semi-cylinders with halves of semi-spherical bottoms. They are fixed on a disk 18 which is fixedly connected with a bearing 19. The semi-cylinders are oriented so that their convexities are directed in a direction of rotation of the blade apparatus. An inter-phase flow 20 is arranged inside the perforated casing 9 and has conical plugs 21 located on the rods above and below and capable of blocking the openings for water draining in a saddle 22 and the opening for withdrawal of liquid hydrocarbons in the saddle 23. Moreover, plate elements 24 having various configurations are mounted on the rods 14, as well as brushes 25 of different profiles are mounted on the rods as well. A whirling element 26 is arranged in the cylinder 10.

A cavity for collection of water in a lower part A is provided in the housing 1. This is performed from the cavity to the first stage. A cavity B is provided for collection of water after a first stage of filtration, formed by a conical bottom of the case 9. A cavity C is formed by the cylinder 10 and a surface of the filtering elements 11. A cavity D is an inner cavity in an upper part of the second filtering set. A cavity E is a lower part of the second filtering set.

The use of the cup-shaped blades provides a required torque and a calculated speed of rotation of the rods, which maintains the surfaces of the filtering elements of the first stage clean.

The coaxially arranged second filtering set provides a complete (100%) retention of water, which coagulated in pore passages of the filtering element of the first stage. The cylinder-separator arranged between the filtering sets provides a hydrodynamic mode of coagulation in separation of water droplets, as well as collection of water in the cavity between the filtering sets.

The use of the inter phase float with the conical blocks guarantees an accurate sharp separation of water from liquid hydrocarbons both with a low content of water, and during "plug-like" breakages of water in main product lines.

Moreover, the construction of the rods 14 with combines profiles at different angle of inclination to an axis of the filtering set, with different angles of inclination to a surface of the filtering element 8, and different constructions, created during their rotation a changing attack angle of a turbulent flow, which provides tearing off of particles from the surface of the filtering element and increases the quality of purification. Moreover, depending on the content of mechanical admixtures and water, for each concrete construction its own set of generotrices is selected, in which rods is magnets, with turberilizers and with brushes alternate with one another. During a successive passage of the generotrices above the surface of the filtering element 8, a maximum effect of purification of the surface of the filter is provided.

The filter separator for purification of liquid hydrocarbons in accordance with the present invention operates in the following manner.

Uncleaned fuel (diesel fuel, gasoline, kerosene), hereinafter referred to "fuel" is supplied under the pressure into the housing 1 through the pipe 6, and with a speed pressure is supplied to the blade apparatus 17 which is formed by cup-shaped blades so as to turn it into inner rotation. Then, liquid is introduced into the annular cavity between the housing 1 and the filter 8. The blade apparatus 17 turns into rotation the system of rods 14 which entrains the layers of liquid adjoining the filter 8 and creates a tangential component of a flow speed which is different from zero, near the filtering surface. Therefore in view of inertia forces, this makes possible to prevent penetration of solid particles into the body of the filtering element 8. The magnetic plate 24 which are arranged on the rods 14 form a magnetic screen which retains the magnetic parts and conglomerates them so as to deposit them on the rods 14. The zone of increase concentration of magnetic parts retains also some non metallic particles. When a certain critical size is reached, the conglomerates of metal particles with non metal admixtures included in them are thrown off by a liquid flow into the bottom area of the housing 1 and entrained solid particles adjoining the surface of the filter. During this process the non metallic particles approaches the surface of the filtering element 8, and are thrown off downwardly by the rods 14 by the brushes 25 and drained through the pipe 4.

The liquid which is cleaned from mechanical admixtures passes through the filtering element 8 and the perforated casing 9 and gets into the annual cavity B. Water in combustion-lubrication liquids in a droplet form rolls over the surface of the filtering element 8 into a lower part of the device in FIG. 1, due to hydrophobous property of the filtering element 8 composed of fluroplastic. Low-dispersion water in emulsified condition in diesel fuel, during passage through the thick-wall filtering element 8 form drops, and on the inner surface of the perforated casing 9, due to forces and the flow of diesel fuel directed downwardly, is accumulated in the lower part of the cavity B. It is drained periodically through the draining pipe 3. The diesel fuel which is not completely purified from low or from small water drops (below 100 mcm) is supplied into the cavity, going around the cylinder 10 from above. In the cavity C the diesel fuel approaches the outer surface of the filtering element 11 through the whirling element 26. The emulsified water, due to its hydrophobous property of the filtering element 11, is retained on the surface and due gravitation forces and a vertical component of the flow, flows into the lower part of the apparatus and is drained through the pipe 1C. The diesel fuel which is completed purified from mechanical admixtures (more than 1 mcm) and water (100%) is supplied into the inner cavity of the filtering element 11 which is subdivided into the cavity D and cavity E, and leaves through the pipe 7. The inter phase valves 20 with the conical plugs 21 is located in the inner cavity of the filtering element 11. The inter phase valves 20 with the plugs drowns in the diesel fuel and flows in the depressed condition on the surface of water. In a stationary remote, the purification of the diesel fuel with water content up to 15% is described above. In the event in the "water plug" occurs, or in other words in the pipe line a great quantity of water (20%–100%) is accumulated, only water is supplied to the filter, the float 20 raises, and the conical plug 2 tightly closes the conical seat 23 to prevent water entry into the diesel fuel. The plug 21 opens the conical seat 22, and water in a full flow is drained through the draining pipe 4 into a water reservoir. The rotatable brushes 25 prevent crust formation of the surface filtering element 8 due to the constant throwing off (cleaning) along the whole length and along the whole periphery of the filter. Since the magnetic screen is rotatable around the filtering element 8, the plate elements are cleaned from mechanical admixture during the operation of the filter since "brushes" formed on the surface of the magnetic plates from mechanical admixtures will be thrown into the lower part of the housing 1 under the action of gravitational forces.

In addition to this, since the rods 14 are arranged with different angles of inclination to an axis of the filtering set with different angels of inclination to a surface of the filtering element 8, and of different designs, during the rotation the attack angle is changed and a changeable turbulent flow is created, to provide the tearing off of particles from the surface of the filtering element and to increase a quality of the purification. Since the rods are formed screw-shaped, this contributes to creation of vertical component of the flow of the diesel fuel in the filter. The rotatable brushes on the rods 14 prevents crust formation of the surface of the filtering element along the whole length and the whole parameter and also contribute to acceleration of deposition of mechanical admixtures in water into a tray.

It will be understood that each of the elements described above, or two or more together, may also find a useful application in other types of constructions differing from the types described above.

While the invention has been illustrated and described as embodied in filter-separator for purifying liquid hydrocarbons, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A filter separator for purification of liquid hydrocarbons, comprising a housing provided with an inlet pipe and an outlet pipe; a first filtering element located in said housing; a magnetic screen including a plurality of rods and magnetic plate elements fixedly arranged on said plurality of rods, said magnetic screen being rotatable around said first filtering element; a rotary drive being formed by a plurality of cup-shaped blades connected to said rod for rotating said magnetic screen around said first filtering element.

2. A filter separator as defined in claim 1, wherein some of said plurality of rods are provided with brushes.

3. A filter separator as defined in claim 1; and further comprising a second filtering element which is located coaxially to said first filtering element and has upper and lower ends provided with conical seats.

4. A filter separator as defined in claim 1, wherein said first filtering element and said second filtering element form an annular cavity therebetween; and further comprising a cylinder separator located in said cavity.

5. A filter as described in claim 1, wherein said inter phase float has conical plugs.

\* \* \* \* \*